United States Patent
Sasaki et al.

(10) Patent No.: US 12,189,908 B2
(45) Date of Patent: Jan. 7, 2025

(54) TOUCH PANEL APPARATUS AND MANUFACTURING METHOD THEREFOR

(71) Applicant: NEC Platforms, Ltd., Kawasaki (JP)

(72) Inventors: Yuta Sasaki, Kanagawa (JP); Akihisa Iwata, Kanagawa (JP); Katsumi Harashima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 41 days.

(21) Appl. No.: 18/012,384

(22) PCT Filed: Jun. 2, 2021

(86) PCT No.: PCT/JP2021/020935
§ 371 (c)(1),
(2) Date: Dec. 22, 2022

(87) PCT Pub. No.: WO2022/004251
PCT Pub. Date: Jan. 6, 2022

(65) Prior Publication Data
US 2023/0273699 A1    Aug. 31, 2023

(30) Foreign Application Priority Data
Jun. 29, 2020 (JP) ................................. 2020-111081

(51) Int. Cl.
*G06F 3/042* (2006.01)
*G06F 3/044* (2006.01)

(52) U.S. Cl.
CPC .......... *G06F 3/0444* (2019.05); *G06F 3/0428* (2013.01)

(58) Field of Classification Search
CPC ...... G06F 3/0444; G06F 3/0428; G06F 3/041; Y02B 10/70
See application file for complete search history.

(56) References Cited

U.S. PATENT DOCUMENTS

2011/0102343 A1*  5/2011  Imai ........................ G06F 3/041
345/173

FOREIGN PATENT DOCUMENTS

| JP | 2000246991 A | * | 9/2000 | ............. G06F 3/033 |
| JP | 2009-031827 A |  | 2/2009 | |
| JP | 2019-086749 A |  | 6/2019 | |

(Continued)

OTHER PUBLICATIONS

International Search Report for PCT Application No. PCT/JP2021/020935, mailed on Jul. 13, 2021.

(Continued)

*Primary Examiner* — Towfiq Elahi

(57) ABSTRACT

Cumbersomeness that is caused when a protective sheet is attached over a touch panel is alleviated. A touch panel apparatus (10) according to an example embodiment includes a roughly rectangular touch panel (13), a transparent protective sheet (12) having a shape roughly identical to that of the touch panel (13) and detachably disposed so as to cover a front surface of the touch panel (13), a lower-side holding part (11*a*) that holds the protective sheet (12), disposed on a lower side of the touch panel (13), and a left-side holding part (11*b*) and a right-side holding part (11*c*) that hold the protective sheet (12), disposed on two lateral sides, respectively, of the touch panel (13), the two lateral sides being adjacent to the lower side of the touch panel (13).

5 Claims, 29 Drawing Sheets

(56) References Cited

FOREIGN PATENT DOCUMENTS

KR 101466029 B1 * 12/2014 ............. G06F 3/041

OTHER PUBLICATIONS

Product Information, privacy filter EF-PFS Series, EF-PFS133W2, elecom, online, Sep. 12, 2014, [retrieval date: Jul. 5, 2021], internet :<URL:https://web.archive.org/web/20140912082332/https://www.elecom.co.jp/ products/EF-PFS133W2.html>.

* cited by examiner

TOUCH PANEL APPARATUS AND MANUFACTURING METHOD THEREFOR

This application is a National Stage Entry of PCT/JP2021/020935 filed on Jun. 2, 2021, which claims priority from Japanese Patent Application 2020-111081 filed on Jun. 29, 2020, the contents of all of which are incorporated herein by reference, in their entirety.

TECHNICAL FIELD

The present invention relates to a touch panel apparatus and a method for manufacturing a touch panel apparatus.

BACKGROUND ART

Patent Literature 1 discloses that a protective sheet is detachably attached over an operation display screen of a printing apparatus in order to prevent the operation display screen from getting dirty. Partial protrusions extending from a flat part are provided near the four corners of the protective sheet. Further, folded parts, which restrict the vertical and horizontal movements of the protective sheet relative to the operation display screen, are provided on the top, bottom, left and right edges of the protective sheet. When the protective sheet is attached, the protective sheet is bent so that its middle part bulges, and the partial protrusions are forcefully inserted into the gaps between a sealing gasket and the operation display screen. In this state, the folded parts of the protective sheet come into contact with the outer side of the gasket while conforming to the shape thereof.

CITATION LIST

Patent Literature

Patent Literature 1: Japanese Unexamined Patent Application Publication No. 2000-246991

SUMMARY OF INVENTION

Regarding a terminal that is operated by touching its screen, it is required to disinfect its touch panel by wiping it with a cloth or the like dampened with alcohol or a disinfectant after an unspecified user touches the touch panel in order to prevent the spread of infectious diseases. However, if the touch panel does not have chemical resistance, the appearance of the touch panel may deteriorate and/or the touch panel may be destroyed due to the deterioration of the material thereof. Therefore, there is an urgent need to develop a protective sheet that can be easily attached to an existing terminal and easily replaced with new one.

The attaching of the protective sheet disclosed in Patent Literature 1 is cumbersome because the partial protrusions near the four corners need to be forcefully inserted into the gaps between the sealing gasket and the operation display screen.

In view of the above-described problem, an object of the present disclosure is to provide a touch panel apparatus and a method for manufacturing a touch panel capable of alleviating cumbersomeness that is caused when a protective sheet is attached over a touch panel.

A touch panel apparatus according to an aspect of the present invention includes: a roughly rectangular touch panel; a transparent protective sheet having a shape roughly identical to that of the touch panel and detachably disposed so as to cover a front surface of the touch panel; a lower-side holding part configured to hold the protective sheet, disposed on a lower side of the touch panel; and two lateral-side holding parts configured to hold the protective sheet, disposed on two lateral sides, respectively, of the touch panel, the two lateral sides being adjacent to the lower side of the touch panel.

A method for manufacturing a touch panel apparatus according to an aspect of the present invention includes: providing a lower-side holding part on a lower side of a roughly rectangular touch panel; providing two lateral-side holding parts on two lateral sides, respectively, of the touch panel, the two lateral sides being adjacent to the lower side of the touch panel; and disposing a transparent protective sheet having a shape roughly identical to that of the touch panel, from a side of the touch panel on which none of the lower-side holding part and the lateral-side holding parts is disposed, so as to cover a front surface of the touch panel, and detachably holding the protective sheet by the lower-side holding part and the lateral-side holding parts.

According to the present invention, it becomes possible to alleviate cumbersomeness that is caused when a protective sheet is attached over a touch panel.

EXAMPLE EMBODIMENT

Figure 1:
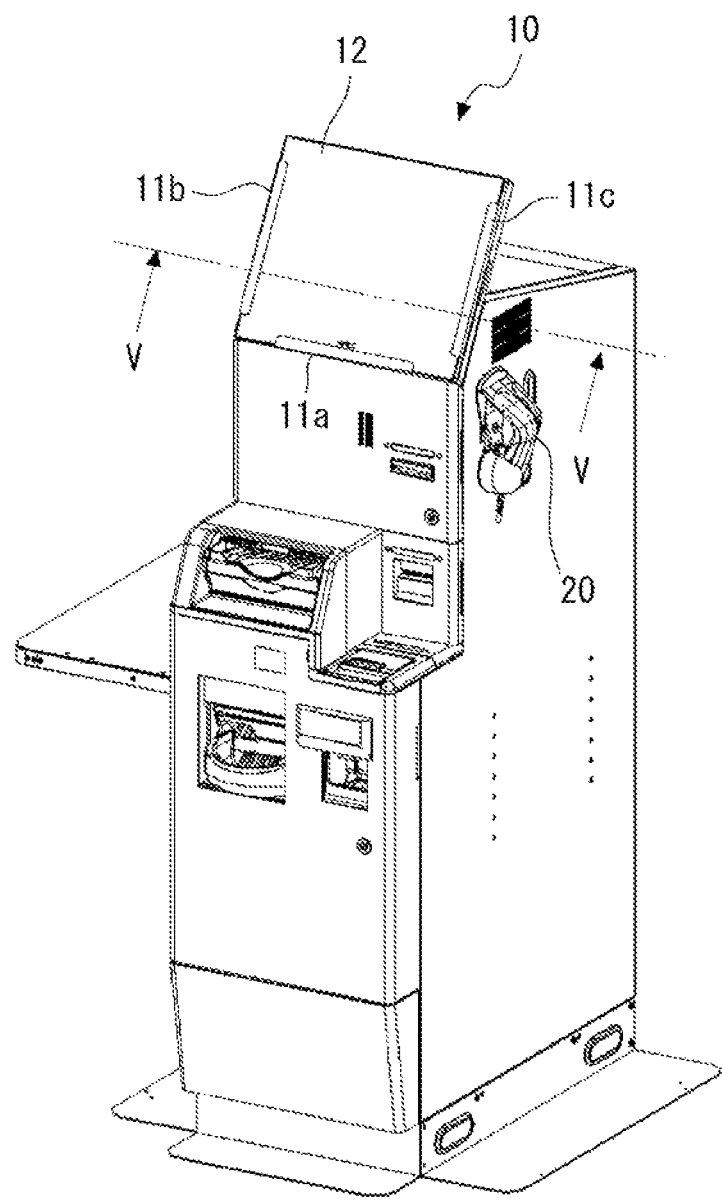
FIG. 1 shows a configuration of a POS terminal to which a touch panel apparatus according to a first example embodiment is applied.

A specific example embodiment to which the present invention is applied will be described hereinafter in detail with reference to the drawings. However, the present invention is not limited to the below-shown example embodiment. Further, the following descriptions and the drawings are simplified as appropriate for clarifying the explanation. The same reference numerals (or symbols) are assigned to the same components throughout the drawings, and descriptions thereof are omitted as appropriate.

First Example Embodiment

Figure 2:
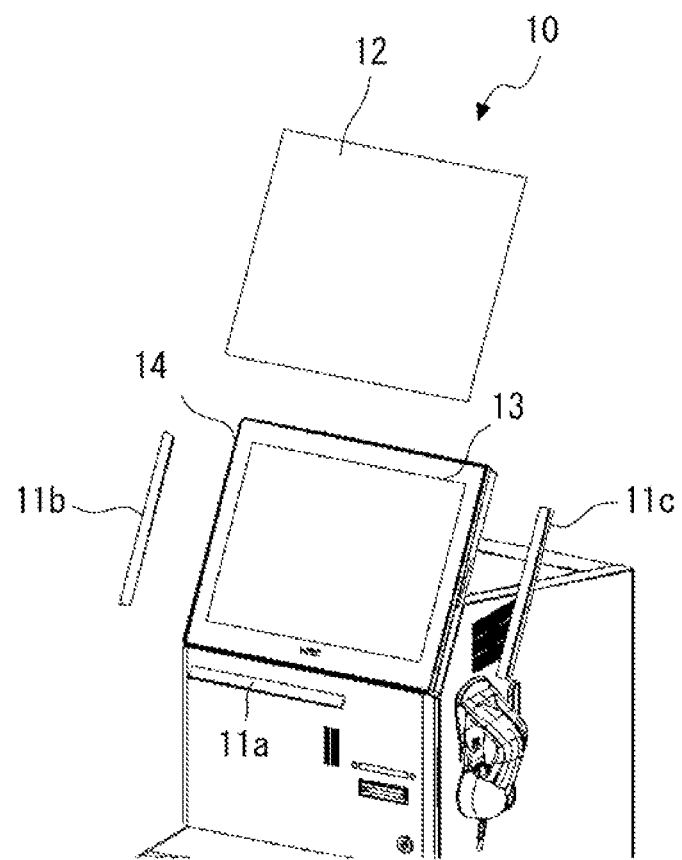
FIG. 2 is an exploded perspective view of the touch panel apparatus shown in FIG. 1.

FIG. 1 shows a configuration of a POS (Point Of Sales) terminal to which a touch panel apparatus 10 according to a first example embodiment is applied. FIG. 2 is an exploded perspective view of the touch panel apparatus 10 shown in FIG. 1. The below-described usage is for a self-POS terminal operated by unspecified users.

As shown in FIG. 1, the touch panel apparatus 10, which serves as a display operation screen, is disposed at the center of the upper part of the POS terminal as viewed from the front thereof. The touch panel apparatus 10 includes a touch panel 13 including a display and a touch sensor, displays images for users, and receives operations from users.

For example, the touch panel 13 can display an operating procedure of the POS terminal, information about a commodity read by a handy scanner 20 (which will be described later), a total amount of money for registered commodities, an amount of received money, and an advertisement or the like for users. Further, by sensing a contact (i.e., a touch) from the outside, the touch panel 13 can receive, for example, an operation for selecting a commodity to be registered for settlement therefor (i.e., for payment therefor), an operation for entering an amount of money for a commodity and/or a discount amount therefor, and an operation for selecting a payment method.

When the POS terminal is installed on a horizontal installation surface, the touch panel 13 is disposed so that it is inclined at a predetermined angle with respect to the ground surface. The operation method for the touch panel 13 may be any of various operation methods such as a resistive film method, a capacitance method, a matrix switch, a surface acoustic wave method, an infrared method, and an electromagnetic induction method.

The handy scanner 20 is disposed on the right-side surface of the POS terminal as viewed from the front thereof. The handy scanner 20 is used, for example, to read a barcode attached to a commodity. Note that the illustration of the part of the cable of the handy scanner 20 is omitted in the drawing. A fixed scanner equipped with a reading window may be provided in place of the handy scanner.

In addition to the above-described configuration, the POS terminal according to the example embodiment includes other units such as a bill handling unit, a coin handling unit, an IC card reader, and a receipt printer, and is also equipped with a bill insertion/discharge slot, a coin insertion slot, a coin discharge slot, a card insertion slot, a receipt discharge slot, and the like. Further, the POS terminal may be formed by a plurality of apparatuses, such as a combination of a commodity registration apparatus (a checker apparatus) and a settlement apparatus (a cashier apparatus). In this case, these apparatuses are connected to one another through wired or wireless communication through a communication circuit. The commodity registration apparatus transmits information about a commodity to be settled (i.e., to be paid) to the settlement apparatus. The settlement apparatus performs a settlement process for the commodity to be settled and, when necessary, outputs change and a receipt.

As shown in FIG. 2, the touch panel apparatus 10 includes the touch panel 13, a frame 14, a lower-side holding part 11a, a left-side holding part 11b, a right-side holding part 11c, and a protective sheet 12. The touch panel 13 has a roughly rectangular shape. The frame 14 is shaped in a frame-like shape so as to surround the outer periphery of the touch panel 13. The touch panel 13 is housed in the frame 14. The lower-side holding part 11a, and the left-side and right-side holding parts 11b and 11c are attached to the frame 14.

The lower-side holding part 11a is disposed on the lower side of the touch panel 13. The left-side and right-side holding parts 11b and 11c are disposed on the two sides, i.e., the left and right sides, respectively, of the touch panel 13 adjacent to the lower side thereof. In the first example embodiment, the lower-side holding part 11a is disposed independently of the left-side and right-side holding parts 11b and 11c. The length of the lower-side holding part 11a can be, for example, about one third of the length of the lower side of the touch panel 13. The lower-side holding part 11a can be disposed at the center of the lower side of the touch panel 13.

The length of each of the left-side and right-side holding parts 11b and 11c may be, for example, about one third of the lateral side of the touch panel 13. The left-side and right-side holding parts 11b and 11c can be disposed at the centers of the left and right sides, respectively, of the touch panel 13. Note that a plurality of lower-side holding parts 11a, a plurality of left-side holding parts 11b, and a plurality of right-side holding parts 11c may be arranged at equal intervals along the lower side, and the left and right sides of the touch panel 13.

Figure 3:
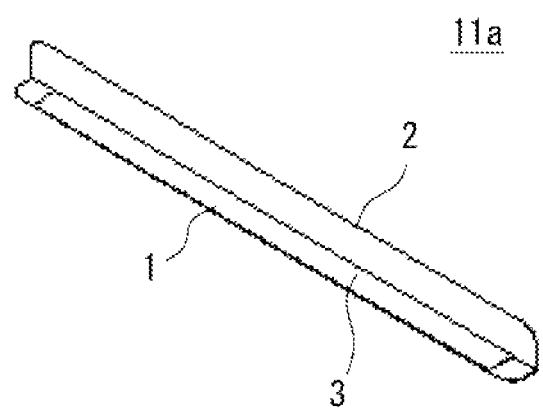
FIG. 3 shows a configuration of a lower-side holding part shown in FIG. 1.
Figure 4:
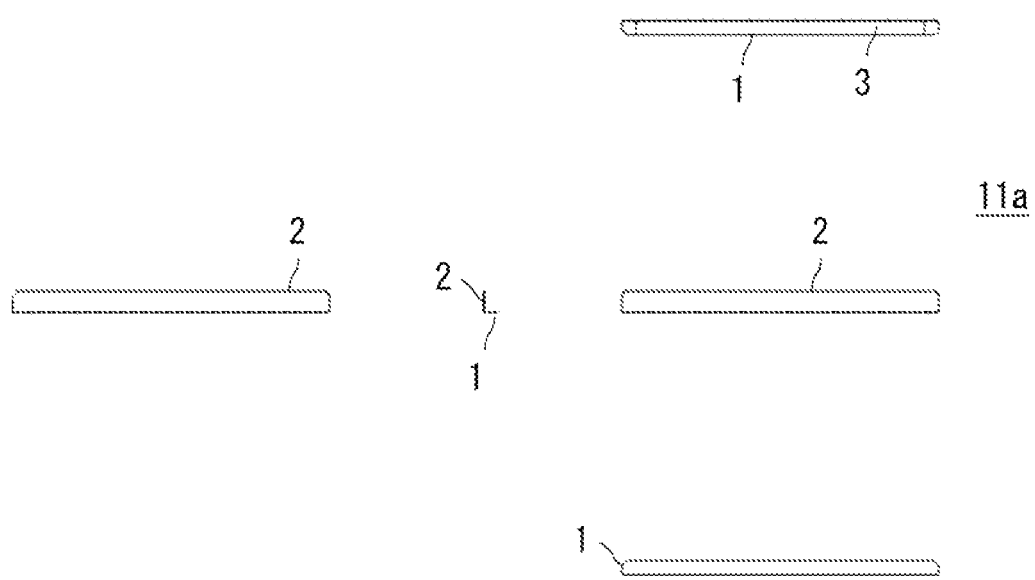
FIG. 4 shows six-sided views of the lower-side holding part shown in FIG. 1.

The lower-side holding part 11a, and the left-side and right-side holding parts 11b and 11c have shapes and structures identical to each other. As a representative example, the structure of the lower-side holding part 11a will be described hereinafter. FIG. 3 shows the structure of the lower-side holding part 11a and FIG. 4 shows six-sided views thereof. As shown in FIGS. 3 and 4, the lower-side holding part 11a includes an attachment part 1, an extension part 2, and double-sided tape (i.e., a piece of double-sided tape) 3. The lower-side holding part 11a is a long and narrow member having an L-shape in cross section. The lower-side holding part 11a is made of, for example, a synthetic resin that is easily molded. Examples of the synthetic resin include silicone resins, polyvinyl chloride, polypropylene, polyethylene, and polycarbonate.

The double-sided tape 3 is disposed in the central part of the attachment part 1. In the first example embodiment, the attachment part 1 is opposed to the bottom surface of the frame 14 and is bonded (i.e., stuck) to the frame 14 by the double-sided tape 3. Further, the extension part 2 is disposed in a direction roughly perpendicular to the attachment part 1. The extension part 2 extends to an area in front of the front surface of the touch panel 13 when the attachment part 1 is bonded to the frame 14. Specifically, the extension part 2 of the lower-side holding part 11a extends a predetermined distance from the lower side of the touch panel 13 toward the upper side thereof. The extension part 2 of the left-side holding part 11b extends a predetermined distance from the left side of the touch panel 13 toward the right side thereof. The extension part 2 of the right-side holding part 11c extends a predetermined distance from the right side of the touch panel 13 toward the left side thereof.

The protective sheet 12 is detachably disposed so as to cover the front surface of the touch panel 13 which unspecified users touch. Since the protective sheet 12 is attached over the display operation screen of the touch panel 13, touching that a user performs for an input operation is performed over the protective sheet 12, and disinfection and cleaning performed by a person who is in charge of the POS terminal are also performed over the protective sheet 12.

The protective sheet 12 has a shape roughly identical to that of the touch panel 13. That is, the protective sheet 12 has a roughly rectangular shape having no protrusion on any of the sides thereof. The protective sheet 12 is held by the lower-side holding part 11a. Further, the protective sheet 12 is held by the left-side and right-side holding parts 11b and 11c, so that the movements of the protective sheet 12 in the left/right direction are restricted.

The protective sheet 12 needs to be wiped with a cloth or the like dampened with alcohol or a disinfectant in order to disinfect it. Therefore, a material having excellent chemical resistance is used for the protective sheet 12. Examples of materials for the protective sheet 12 include polyester, polycarbonate, and polyethylene. The thickness of the protective sheet 12 can be determined as desired while taking the operability and cleanability of the touch panel 13, and ease of replacement of the protective sheet 12 into consideration. As an example, a polyester film having a thickness of 0.188 mm was used for the protective sheet 12.

Figure 5:
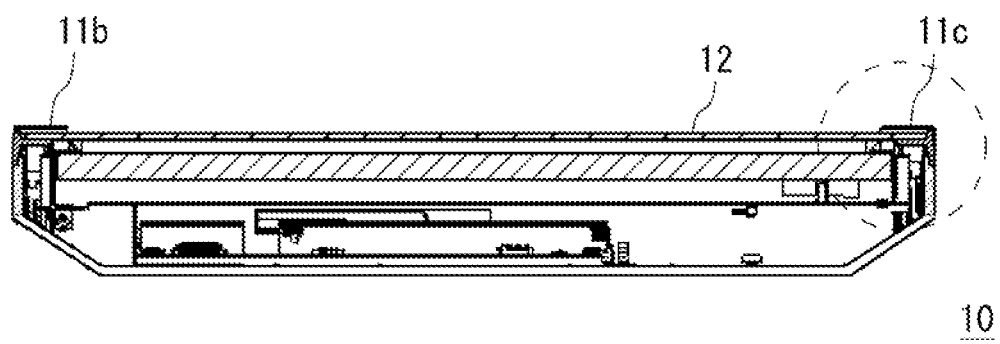
FIG. 5 is a cross-sectional view of the touch panel apparatus taken along a cutting line V-V in FIG. 1.
Figure 6:
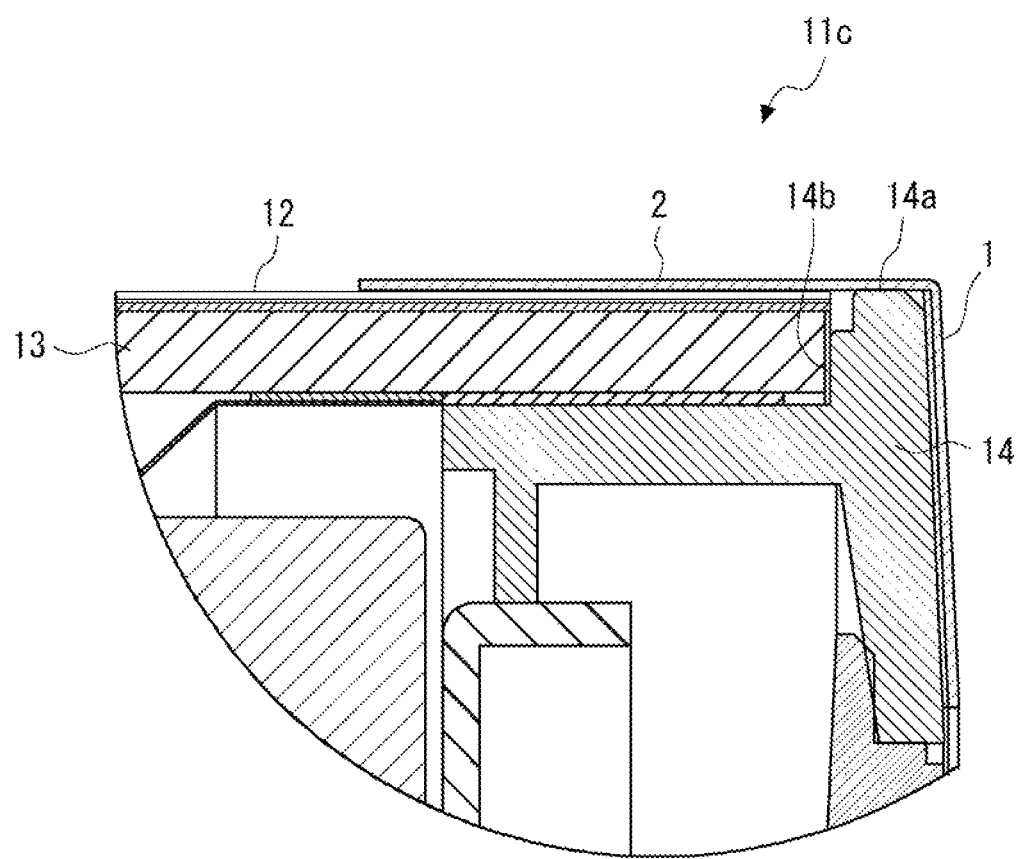
FIG. 6 is an enlarged view of a hatched area in FIG. 5.

FIG. 5 is a cross-sectional view of the touch panel apparatus 10 taken along a cutting line V-V in FIG. 1. FIG. 6 is an enlarged view of a hatched area in FIG. 5. As shown in FIGS. 5 and 6, the touch panel 13 is housed inside a housing part 14b disposed inside the frame 14. The protective sheet 12 is disposed over the touch panel 13 and, similarly to the touch panel 13, is housed inside the housing part 14b. As shown in FIG. 6, a front edge 14a of the frame 14 on the front-surface side of the touch panel 13 protrudes beyond the front-surface of the touch panel 13. The front edge 14a of the frame 14 is, for example, higher than the front surface of the touch panel 13 by 0.25 mm.

Therefore, as the extension part 2 abuts against (i.e., comes into contact with) the front edge 14a of the frame 14, a gap, in which a part of the protective sheet 12 is disposed (i.e., inserted), is formed between the front surface of the touch panel 13 and the extension part 2. The protective sheet 12 enters (i.e., is inserted), from the upper-edge side of the touch panel 13, on which any of the lower-side holding part 11a and the left-side and right-side holding parts 11b and 11c is disposed, into the gap between the front surface of the touch panel 13 and the extension part 2, and is thereby disposed in the gap. Note that in the case where the front edge 14a of the frame 14 does not protrude beyond the front surface of the touch panel 13, i.e., the height of the front edge 14a is equal to or lower than the height of the front surface of the touch panel 13, the lower-side holding part 11a and the left-side and right-side holding parts 11b and 11c may be attached to the touch panel 13 so that the gap, in which a part of the protective sheet 12 is disposed (i.e., inserted), is formed between the front surface of the touch panel 13 and the extension part 2.

The protective sheet 12 can have such a size that it can be confined inside the housing part 14b. Note that, on the upper-edge side, the length of the protective sheet 12 in the lengthwise direction (the up/down direction) may be longer than the length of housing part 14b so that a part of the protective sheet 12 is disposed over the front edge 14a of the frame 14 or protrudes beyond the frame 14. In this way, the protective sheet 12 can be easily inserted and removed. Further, the four corners of the protective sheet 12 may be rounded. In this way, the protective sheet 12 can be easily inserted into the gaps between the front surface of the touch panel 13 and the extension parts 2 of the left-side and right-side holding parts 11b and 11c.

Figure 7:
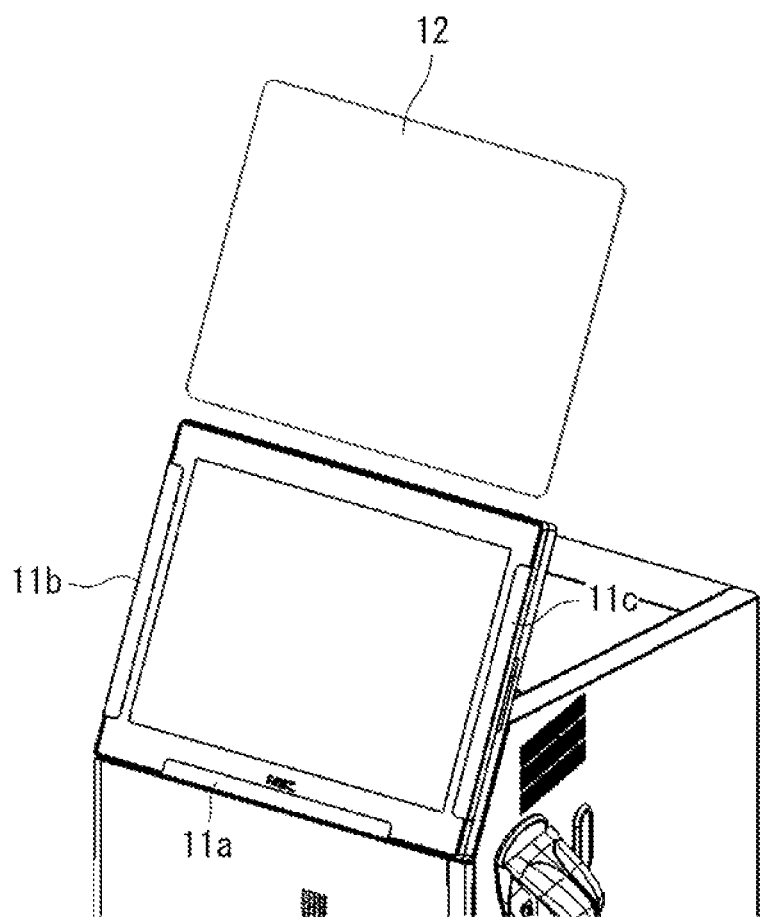
FIG. 7 is a diagram for explaining a method for manufacturing a touch panel apparatus according to the first example embodiment.
Figure 8:
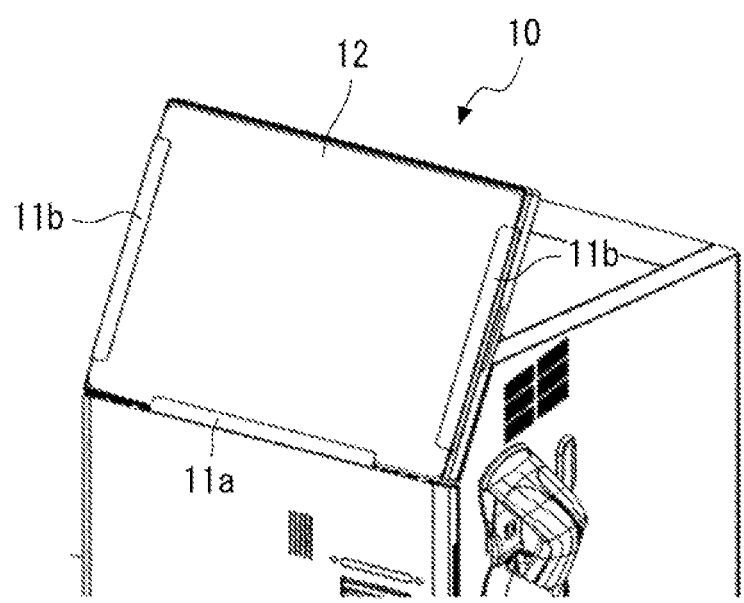
FIG. 8 is a diagram for explaining the method for manufacturing of the touch panel apparatus according to the first example embodiment.

A process for attaching the protective sheet 12 to the touch panel 13, which is a part of the method for manufacturing the touch panel apparatus 10, will be described hereinafter with reference to FIGS. 7 and 8. As shown in FIG. 7, firstly, the lower-side holding part 11a, and the left-side and right-side holding parts 11b and 11c are attached to the lower side, and the left and right sides, respectively, of the frame 14 in which the touch panel 13 is housed. As described above, each of the lower-side holding part 11a and the left-side and right-side holding parts 11b and 11c is bonded (i.e., stuck) by the double-sided tape 3. In this way, a gap, in which the protective sheet 12 is disposed (i.e., inserted), is formed between the front surface of the touch panel 13 and the extension part 2 of each of the holding parts.

Then, the protective sheet 12 is inserted from the upper-edge side, on which any of the lower-side holding part 11a and the left-side and right-side holding parts 11b and 11c is not provided, into the gap between the front surface of the touch panel 13 and the extension part 2 of each of the holding parts. As a result, as shown in FIG. 8, the front surface of the touch panel 13 can be easily covered with the protective sheet 12, thus making it possible to alleviate cumbersomeness that is caused when the protective sheet 12 is attached over the touch panel 13.

Further, touching that a user performs for an input operation, and for disinfection and cleaning is performed over the protective sheet 12. Therefore, it is possible to protect the touch panel 13 from alcohol and a disinfectant solution, which are used for the disinfection, and to prevent the touch panel 13 from deteriorating. Further, the above-described configuration can also be applied to existing POS terminals and those that are already in the market just by attaching the above-described holding parts to them, so that the protective sheet 12 can be easily disposed and replaced with new one.

Second Example Embodiment

Figure 9:
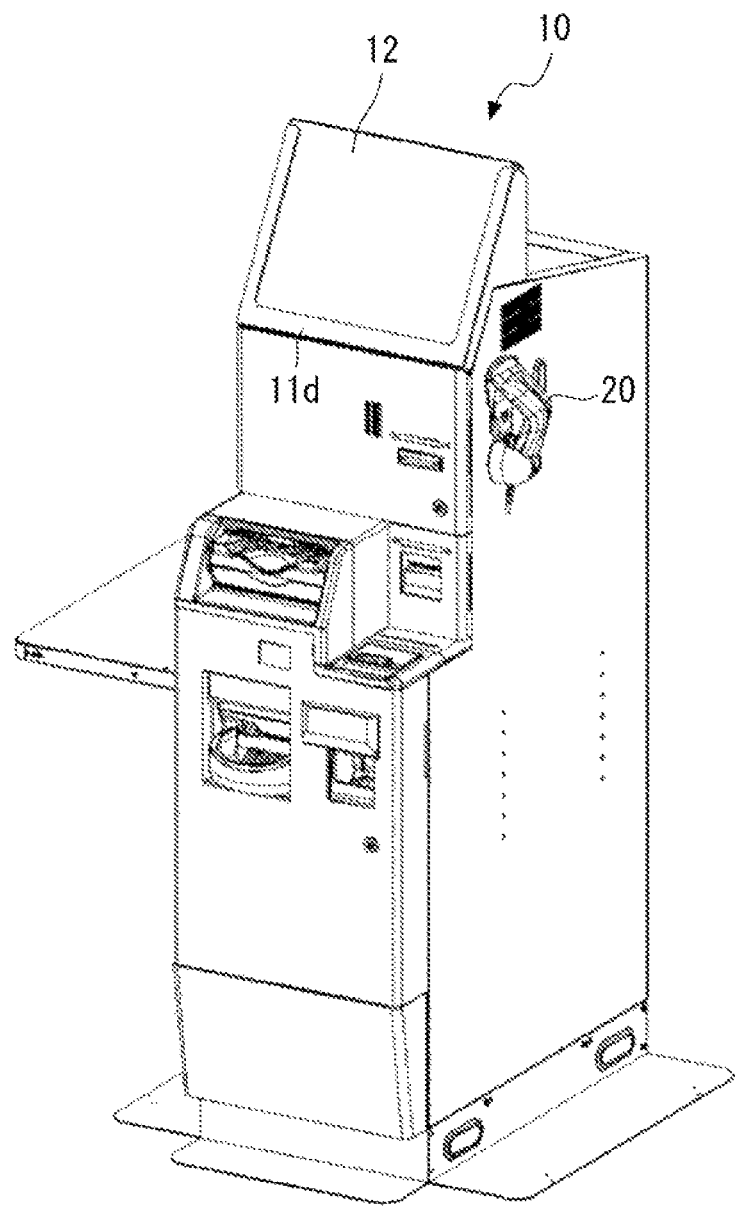
FIG. 9 shows a configuration of a POS terminal to which a touch panel apparatus according to a second example embodiment is applied.
Figure 10:
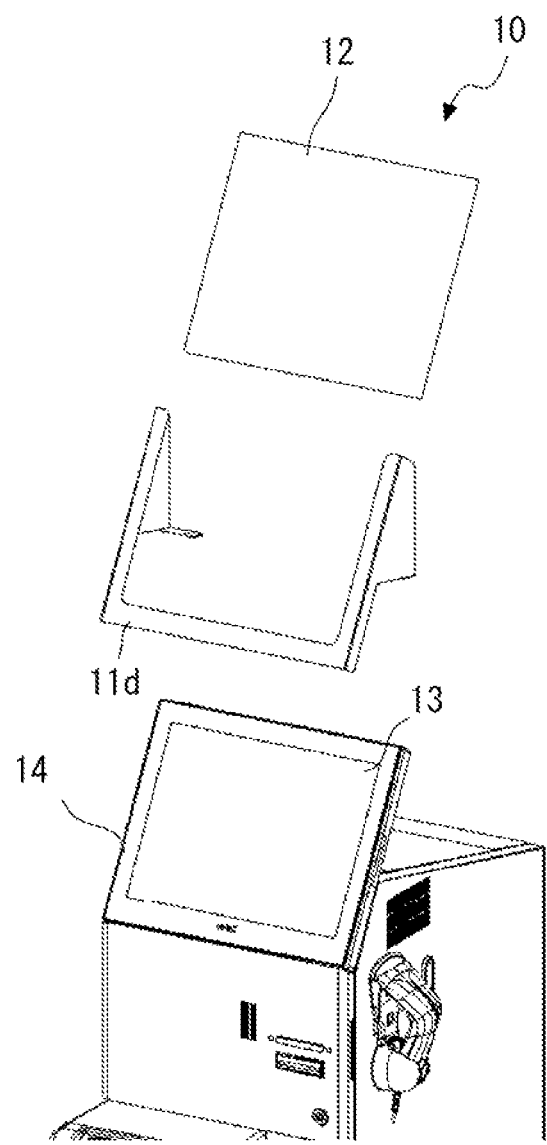
FIG. 10 is an exploded perspective view of the touch panel apparatus shown in FIG. 9.

FIG. 9 shows a configuration of a POS terminal to which a touch panel apparatus 10 according to a second example embodiment is applied. FIG. 10 is an exploded perspective view of the touch panel apparatus 10 shown in FIG. 9. Note that this POS terminal is the same as that according to the first example embodiment except for the configuration of the touch panel apparatus 10, and therefore only the configuration of the touch panel apparatus 10 will be described hereinafter.

Figure 11:
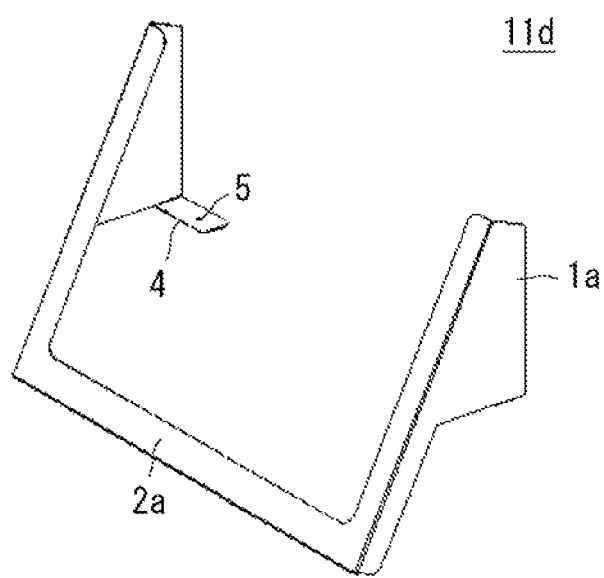
FIG. 11 shows a configuration of an integral-type holding part shown in FIG. 9.
Figure 12:
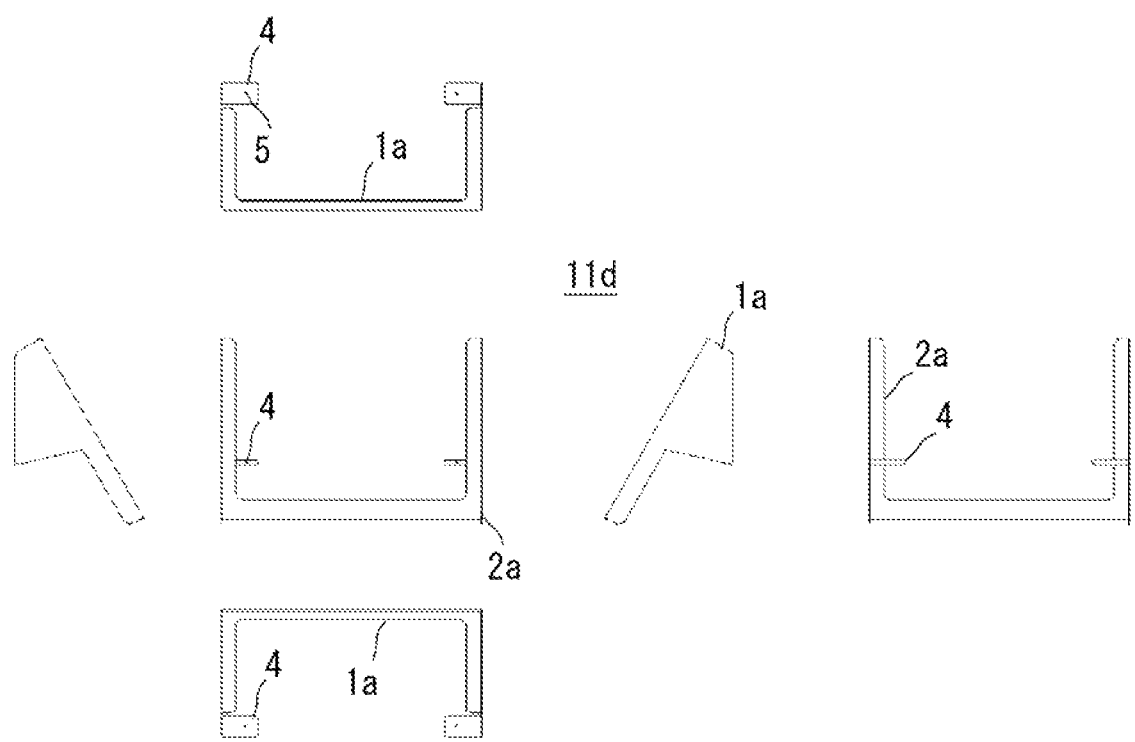
FIG. 12 shows six-sided views of the integral-type holding part shown in FIG. 9.

The difference of the second example embodiment from the first example embodiment lies in an integral-type holding part 11d. The integral-type holding part 11d is continuously provided from the left side of the touch panel 13 through the lower side thereof to the right side thereof. The integral-type holding part 11d is, for example, made of metal and is integrally molded. FIG. 11 shows a configuration of the integral-type holding part 11d shown in FIG. 9, and FIG. 12 shows six-sided views thereof. As shown in FIGS. 11 and 12, the integral-type holding part 11d includes an attachment part 1a, an extension part 2a, tip parts 4, and fixing holes 5.

The integral-type holding part 11d is a U-shaped component that is disposed along the entire lower side, and the entire left and right sides of the touch panel 13 as viewed from the front of the POS terminal. The attachment part 1a is opposed to the bottom side of the frame 14, and to the left and right sides thereof. The parts of the attachment part 1a that are opposed to the left and right sides of the frame 14 extend to the housing of the POS terminal to which the touch panel apparatus 10 is attached.

The fixing hole 5 is provided (e.g., formed) in the tip part 4 (i.e., in each of the tip parts 4) of the attachment part 1a, which is positioned over the housing of the POS terminal. By screwing screws (not shown) through the fixing holes 5 and into screw holes provided in the housing of the POS terminal, the integral-type holding part 11d, which is interposed between the screws and the housing, can be tightly fixed.

The extension part 2a extends to an area in front of the front surface of the touch panel 13 when the attachment part 1a is fixed to the frame 14. Specifically, the extension part 2a of the integral-type holding part 11d includes a part that extends a predetermined distance from the lower side of the touch panel 13 toward the upper side thereof, a part that extends a predetermined distance from the left side of the touch panel 13 toward the right side thereof, and a part that extends a predetermined distance from the right side of the touch panel 13 toward the left side thereof. Note that the integral-type holding part 11d is not provided on the upper-edge side of the touch panel 13.

Similarly to the first example embodiment, as the extension part 2a abuts against the front edge 14a of the frame 14, a gap, in which a part of the protective sheet 12 is disposed, is formed between the front surface of the touch panel 13 and the extension part 2a. The protective sheet 12 enters (i.e., is inserted), from the upper-edge side of the touch panel 13, into the gap between the front surface of the touch panel 13 and the extension part 2, and is thereby disposed in the gap.

Figure 13:
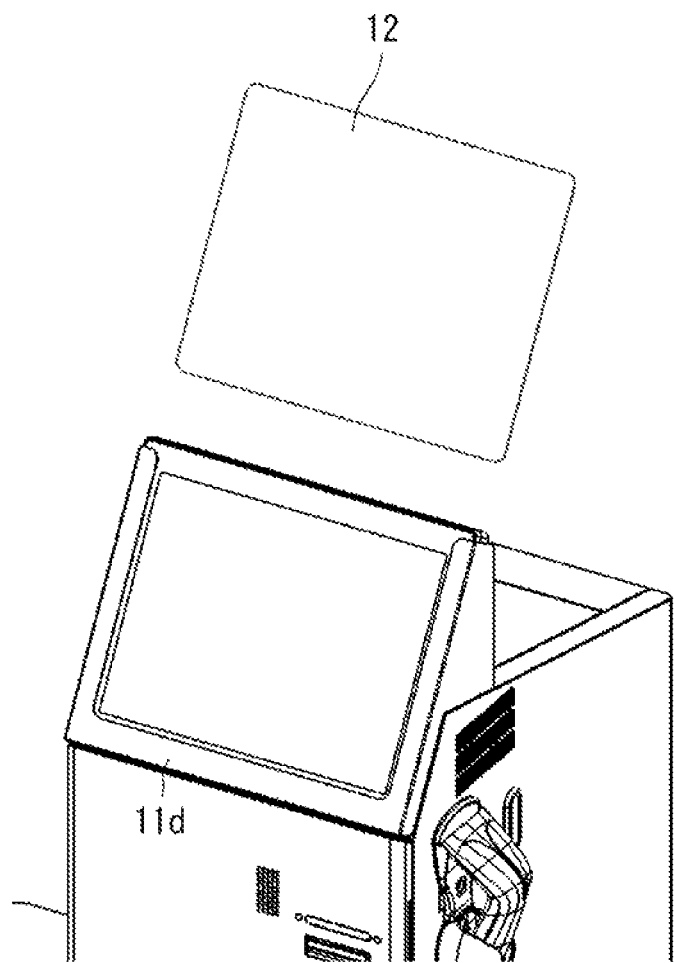
FIG. 13 is a diagram for explaining a method for manufacturing a touch panel apparatus according to the second example embodiment.
Figure 14:
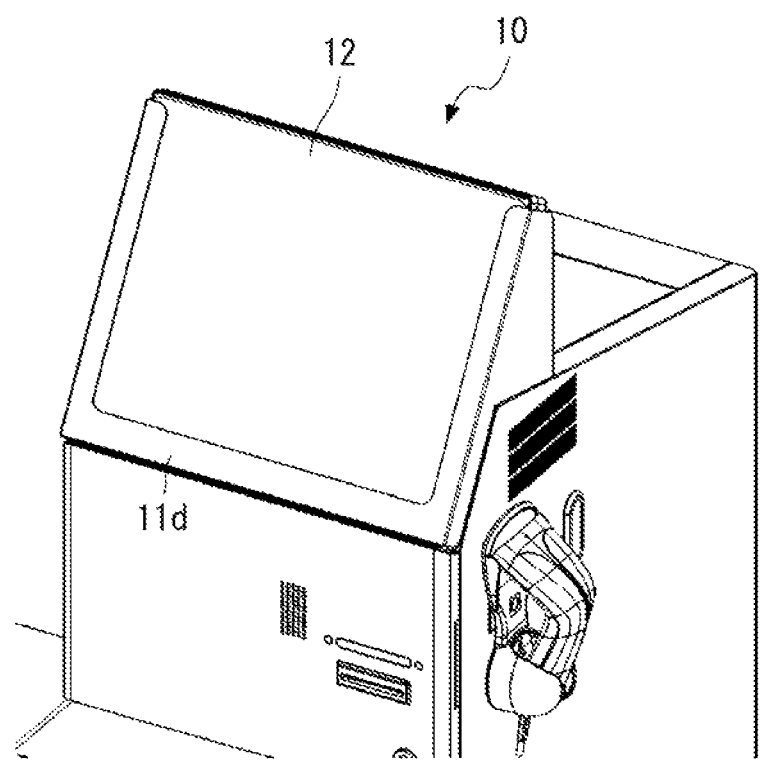
FIG. 14 is a diagram for explaining the method for manufacturing of the touch panel apparatus according to the second example embodiment.

A process for attaching the protective sheet 12 to the touch panel 13, which is a part of the method for manufacturing the touch panel apparatus 10, will be described hereinafter with reference to FIGS. 13 and 14. As shown in FIG. 13, firstly, the integral-type holding part 11d is attached so as to cover the lower side, and the left and right sides of the frame 14 in which the touch panel 13 is housed. As described above, the integral-type holding part 11d is fixed by screws that pass through the fixing holes 5 and are screwed into the screw holes provided in the housing of the POS terminal. In this way, a gap, in which the protective sheet 12 is disposed, is formed between the front surface of the touch panel 13 and the extension part 2a.

Then, the protective sheet 12 is inserted from the upper-edge side of the touch panel 13 into the gap between the front surface of the touch panel 13 and the extension part 2a. As a result, as shown in FIG. 14, the front surface of the touch panel 13 can be easily covered with the protective sheet 12, thus making it possible to alleviate cumbersomeness that is caused when the protective sheet 12 is attached over the touch panel 13.

Third Example Embodiment

Figure 15:
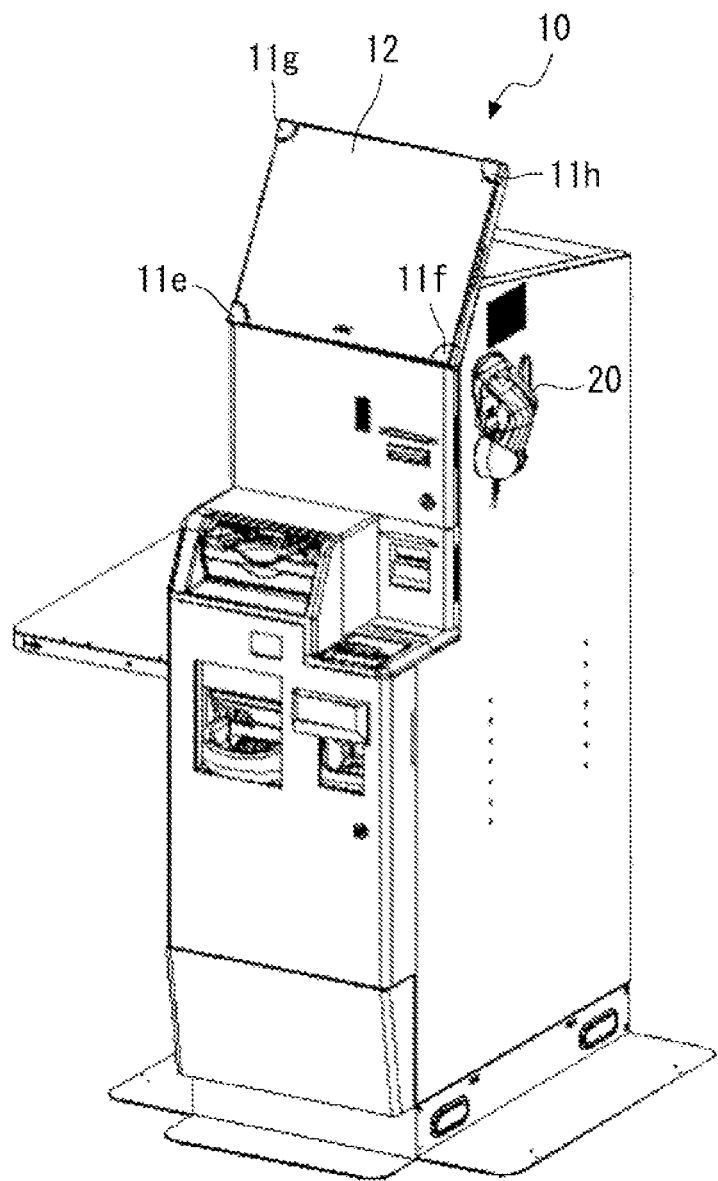
FIG. 15 shows a configuration of a POS terminal to which a touch panel apparatus according to a third example embodiment is applied.
Figure 16:
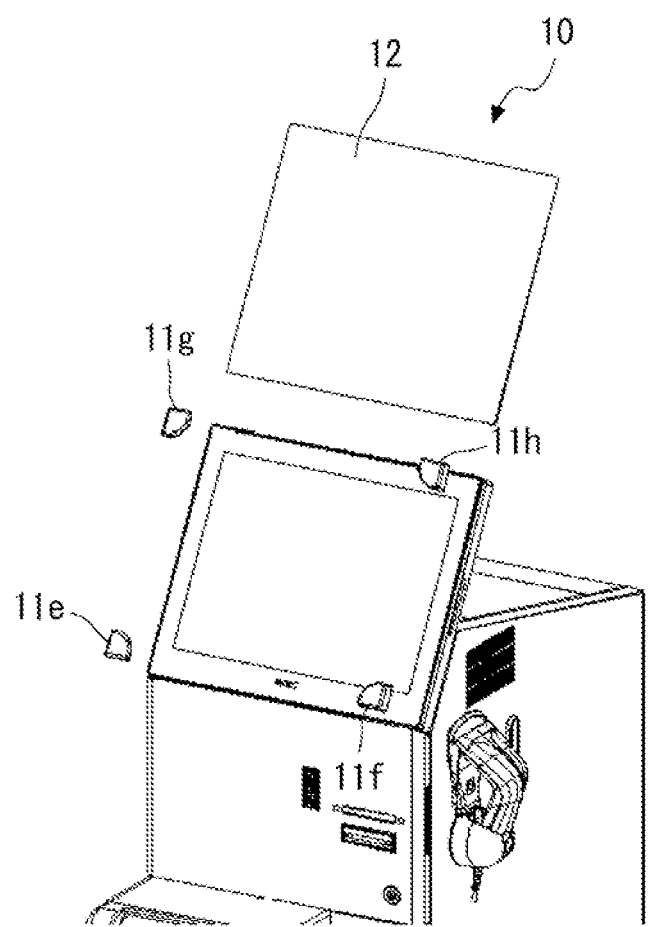
FIG. 16 is an exploded perspective view of the touch panel apparatus shown in FIG. 15.

FIG. 15 shows a configuration of a POS terminal to which a touch panel apparatus 10 according to a third example embodiment is applied. FIG. 16 is an exploded perspective view of the touch panel apparatus 10 shown in FIG. 15. Note that this POS terminal is the same as that according to the first example embodiment except for the configuration of the touch panel apparatus 10, and therefore only the configuration of the touch panel apparatus 10 will be described.

In the third example embodiment, a lower-left edge holding element 11e, a lower-right edge holding element 11f, an upper-left edge holding element 11g, and an upper-right edge holding element 11h are provided at the four corners, respectively, of the touch panel 13. That is, each of the lateral-side holding parts that are disposed on the left and right sides, respectively, is divided into an upper edge holding element and a lower edge holding element that are disposed independently of each other. The lower-left edge holding element 11e, the lower-right edge holding element 11f, the upper-left edge holding element 11g, and the upper-right edge holding element 11h are attached to the frame 14 in which the touch panel 13 is housed. Each of the lower-left edge holding element 11e, the lower-right edge holding element 11f, the upper-left edge holding element 11g, and the upper-right edge holding element 11h is made of, for example, the synthetic resin described in the first example embodiment.

Figure 17:
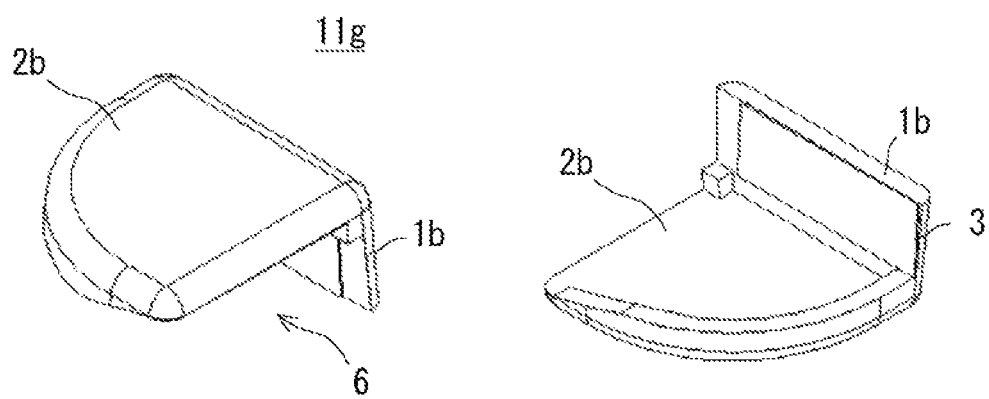
FIG. 17 shows a configuration of an upper-left edge holding element shown in FIG. 15.
Figure 18:
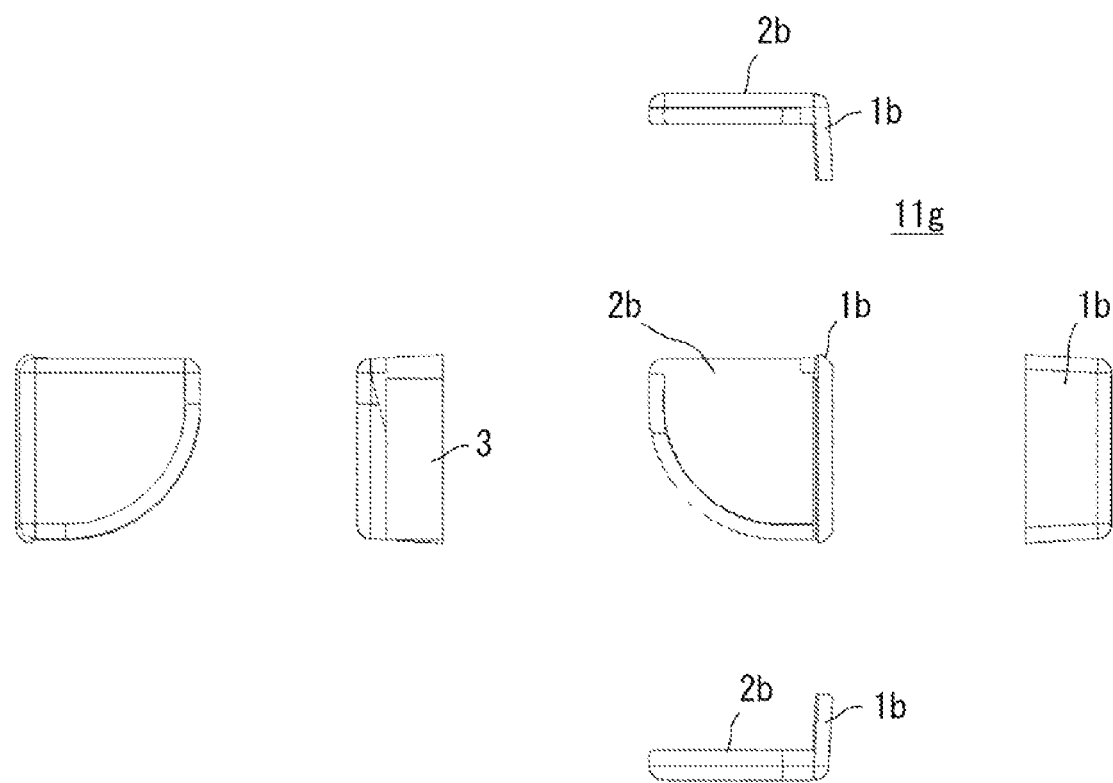
FIG. 18 shows six-sided views of the upper-left edge holding element shown in FIG. 15.
Figure 19:
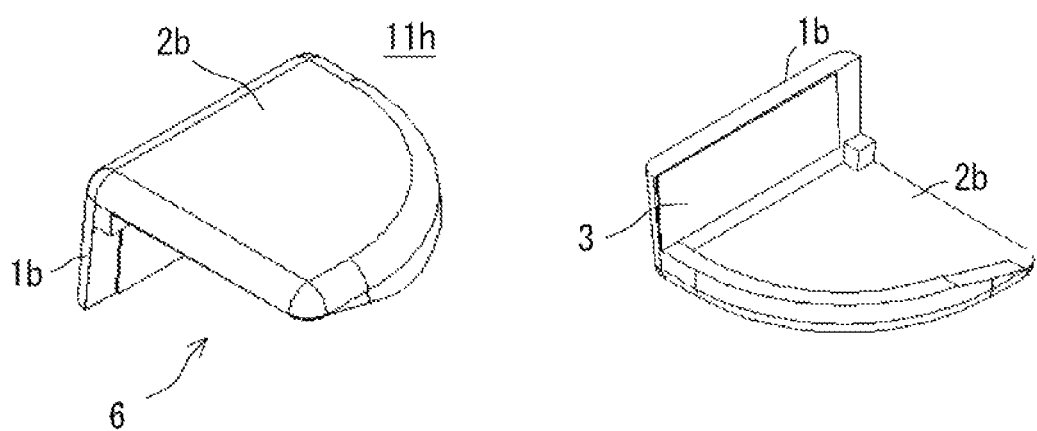
FIG. 19 shows a configuration of an upper-right edge holding element shown in FIG. 15.
Figure 20:
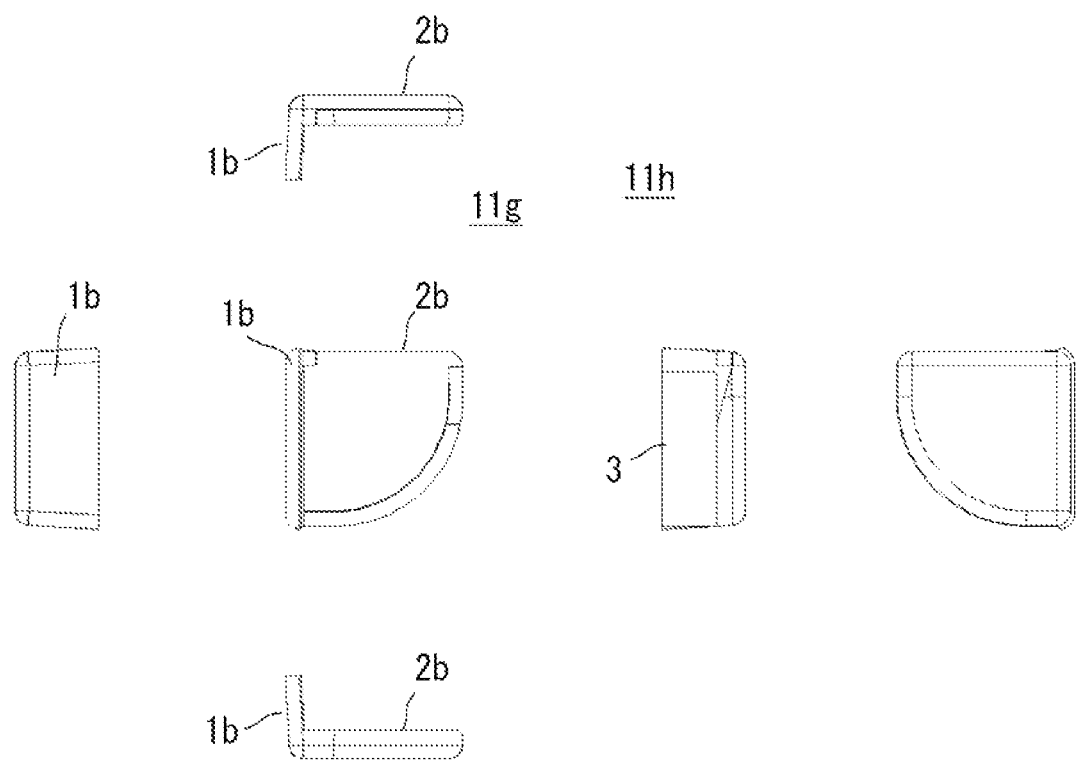
FIG. 20 shows six-sided views of the upper-right edge holding element shown in FIG. 15.

FIG. 17 shows a configuration of the upper-left edge holding element 11g, and FIG. 18 shows six-sided views thereof. Further, FIG. 19 shows a configuration of the upper-right edge holding element 11h, and FIG. 20 shows six-sided views thereof. Each of the upper-left and upper-right edge holding elements 11g and 11h includes an attachment part 1b, an extension part 2b, and double-sided tape (i.e., a piece of double-sided tape) 3. The upper-left and upper-right edge holding elements 11g and 11h become symmetrical to each other with respect to the central axis of the touch panel 13 when they are disposed at the upper-left edge and the upper-right edge, respectively, of the touch panel 13. The structure of the upper-left edge holding element 11g will be described hereinafter in detail.

The extension part 2b has a ¼ circle shape (i.e., a fan-like shape). One of the straight sections of the extension part 2b and the roughly rectangular attachment part 1b are connected to each other at roughly right angles. The double-sided tape 3 is provided on the inner-side surface of the attachment part 1b. The attachment part 1b is opposed to the side surface of the frame 14 and is bonded (i.e., stuck) thereto by the double-sided tape 3. The extension part 2b extends to an area in front of the front surface of the touch panel 13 when the attachment part 1b is bonded to the frame 14. Specifically, the extension part 2 of the upper-left edge holding element 11g extends a predetermined distance from the left side of the touch panel 13 toward the right side thereof. Further, the extension part of the upper-right edge holding element 11h extends a predetermined distance from the right side of the touch panel 13 toward the left side thereof.

Similarly to the first example embodiment, as the extension part 2b abuts against the front edge 14a of the frame 14, a gap, in which a part of the protective sheet 12 is disposed, is formed between the front surface of the touch panel 13 and the extension part 2b. An opened part 6 is formed at a place in each of the upper-left and upper-right edge holding elements 11g and 11h corresponding to the upper side of the touch panel 13. The protective sheet 12 is inserted from the upper-edge side of the touch panel 13 into the gap between the front surface of the touch panel 13 and the extension part 2b through the opened part 6, and is thereby disposed in the gap.

Figure 21:
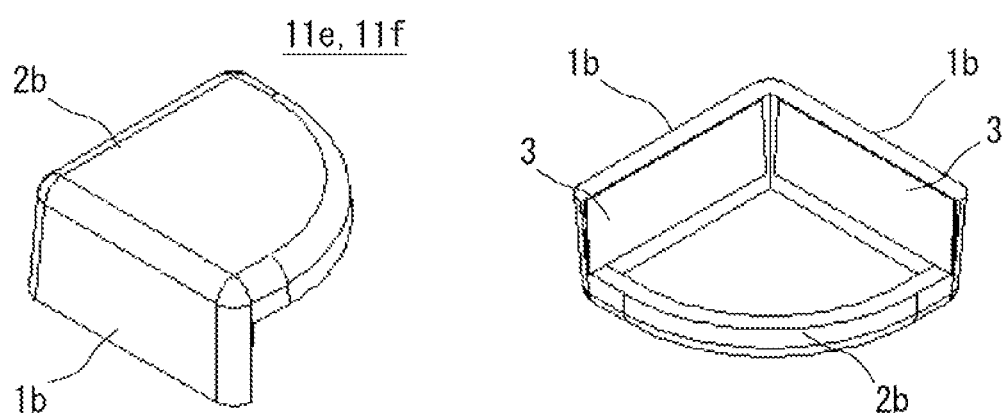
FIG. 21 shows a configuration of left and right lower-edge holding elements shown in FIG. 15.
Figure 22:
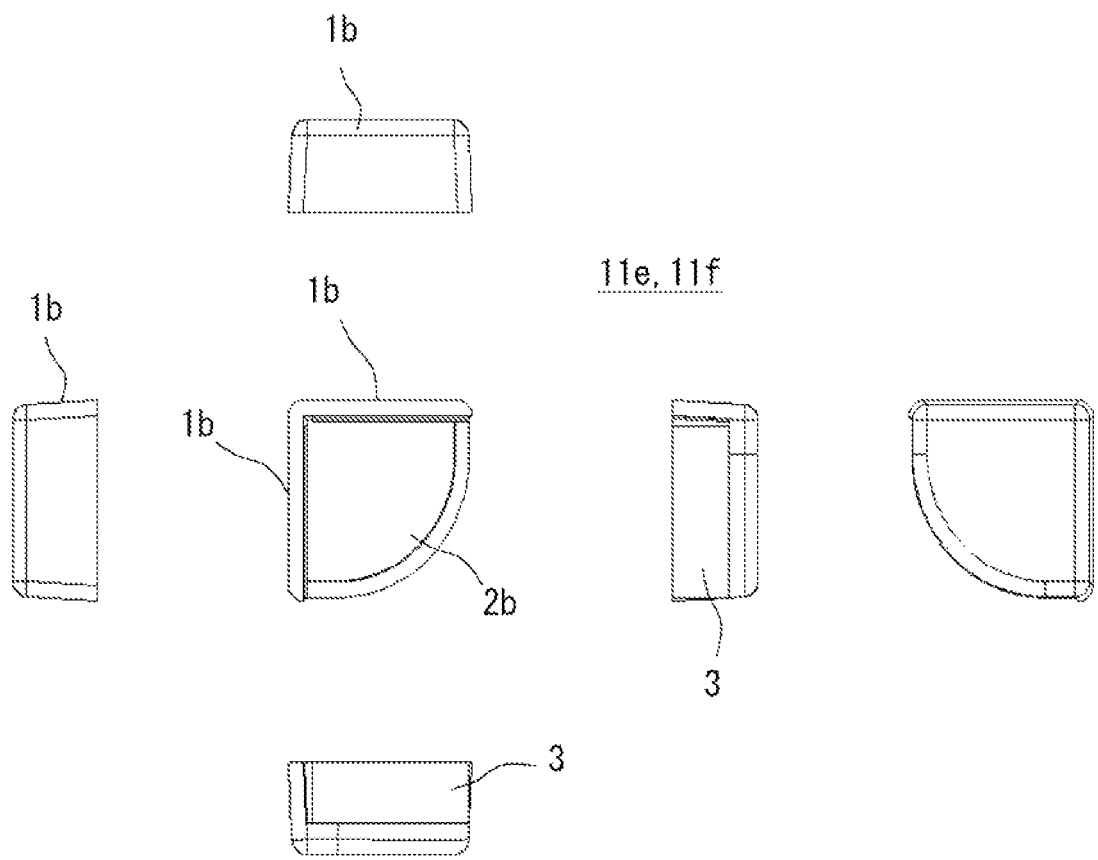
FIG. 22 shows six-sided views of the left and lower-edge holding elements shown in FIG. 15.

The lower-left and lower-right edge holding elements 11e and 11f have shapes and structures identical to each other. FIG. 21 shows structures of the lower-left and lower-right edge holding elements 11e and 11f, and FIG. 22 shows six-sided views thereof. The extension part 2b has a ¼ circle shape. A roughly rectangular attachment part 1b is connected to each of the two straight sections of the extension part 2b at a roughly right angle. When the lower-left and lower-right edge holding elements 11e and 11f are disposed at the lower-left edge and the lower-right edge, respectively, of the touch panel 13, the two attachment parts 1b of each of them are positioned at the lower side and the lateral side, respectively, of the touch panel 13. That is, in the third example embodiment, the lower-side holding part is continuously provided (i.e., continuously extend) from the lower edge holding elements.

The double-sided tape 3 is provided on the inner-side surface of each of the two attachment parts 1b. The attachment part 1b is opposed to the side surface of the frame 14 and is bonded thereto by the double-sided tape 3. The extension part 2b extends to an area in front of the front surface of the touch panel 13 when the attachment part 1b is bonded to the frame 14.

The part of the protective sheet 12 that has passed through the opened parts 6 of the upper-left and upper-right edge holding elements 11g and 11h is disposed in the gap between the front surface of the touch panel 13 and the extension part 2b and held by the lower sides of the lower-left and lower-right edge holding elements 11e and 11f disposed on the lower-edge side. Further, the left and right positions of the protective sheet 12 are restricted by the lower-left and lower-right edge holding elements 11e and 11f disposed on the left and right sides, and the upper-left and upper-right edge holding elements 11g and 11h disposed on the left and right sides. In this way, the protective sheet 12 can be easily disposed over the front surface of the touch panel 13.

A process for attaching the protective sheet 12 to the touch panel 13, which is a part of the method for manufacturing the touch panel apparatus 10, will be described hereinafter (its drawing is omitted). Firstly, the lower-left and lower-right edge holding elements 11e and 11f, and the upper-left and upper-right edge holding elements 11g and 11h are attached to the four corners, respectively, of the touch panel 13. As described above, the lower-left and lower-right edge holding elements 11e and 11f, and the upper-left and upper-right edge holding elements 11g and 11h are bonded (i.e., stuck) to the touch panel 13 by the double-sided tape 3. In this way, a gap, in which the protective sheet 12 is disposed, is formed between the front surface of the touch panel 13 and each of the lower-left and lower-right edge holding elements 11e and 11f, and the upper-left and upper-right edge holding elements 11g and 11h.

Then, the protective sheet 12 is inserted from the upper-edge side, on which the upper-left and upper-right edge holding elements 11g and 11h are provided, into the gap between the front surface of the touch panel 13 and the extension part 2b of each of the holding elements. As a result, the front surface of the touch panel 13 can be easily covered with the protective sheet 12, thus making it possible to alleviate cumbersomeness that is caused when the protective sheet 12 is attached over the touch panel 13.

Fourth Example Embodiment

Figure 23:
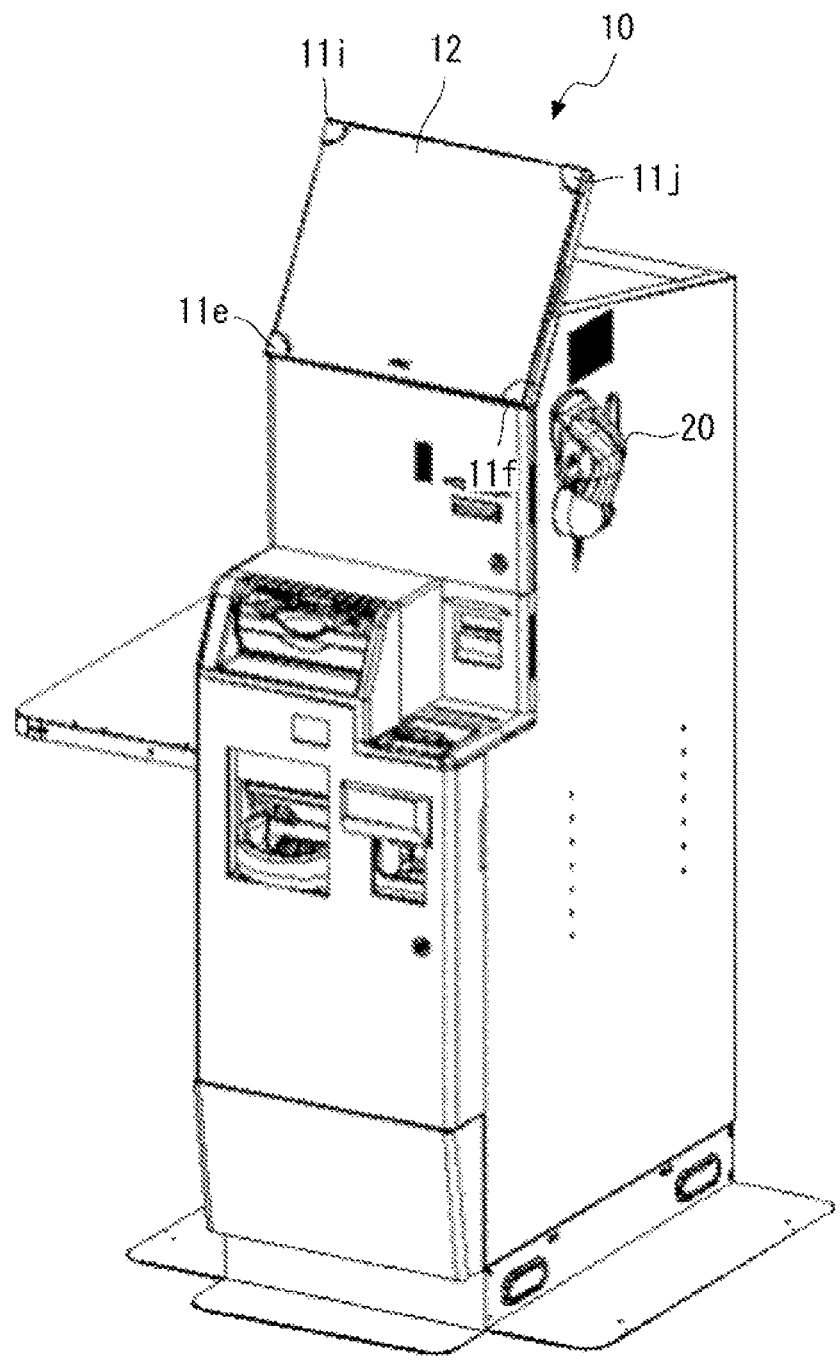
FIG. 23 shows a configuration of a POS terminal to which a touch panel apparatus according to a fourth example embodiment is applied.
Figure 24:
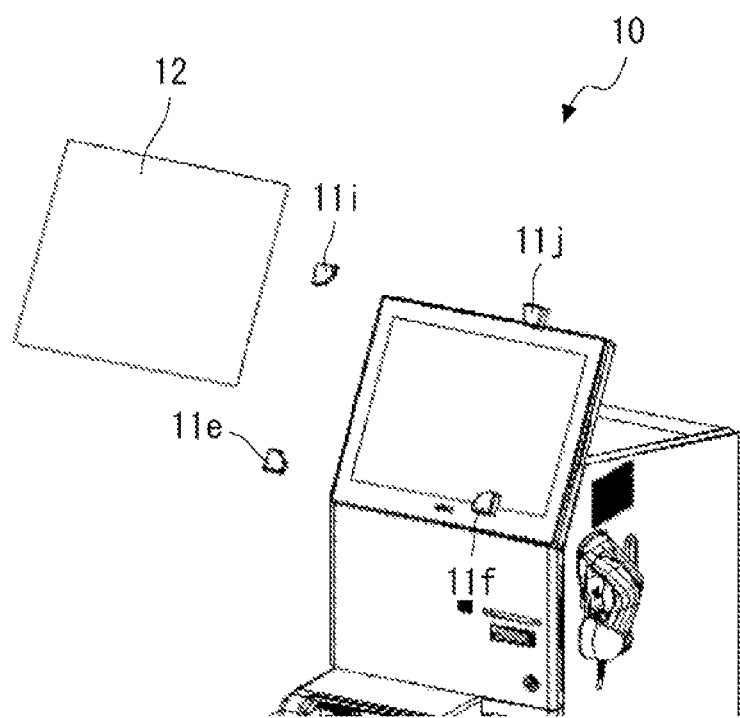
FIG. 24 is an exploded perspective view of the touch panel apparatus shown in FIG. 23.

FIG. 23 shows a configuration of a POS terminal to which a touch panel apparatus 10 according to a fourth example embodiment is applied. FIG. 24 is an exploded perspective view of the touch panel apparatus 10 shown in FIG. 23. Note that this POS terminal is the same as that according to the first example embodiment except for the configuration of the touch panel apparatus 10, and therefore only the configuration of the touch panel apparatus 10 will be described.

In the fourth example embodiment, a lower-left edge holding element 11e, a lower-right edge holding element 11f, an upper-left edge holding element 11i, and an upper-right edge holding element 11j are provided at the four corners, respectively, of the touch panel 13. That is, each of the lateral side holding parts, which are disposed on the left and right sides, respectively, is divided into an upper edge holding element and a lower edge holding element disposed independently of each other. In the fourth example embodiment, in contrast to the third example embodiment, the lower-left and lower-right edge holding element 11e and 11f, and the upper-left and upper-right edge holding elements 11i and 11j are components identical to each other.

Figure 25:
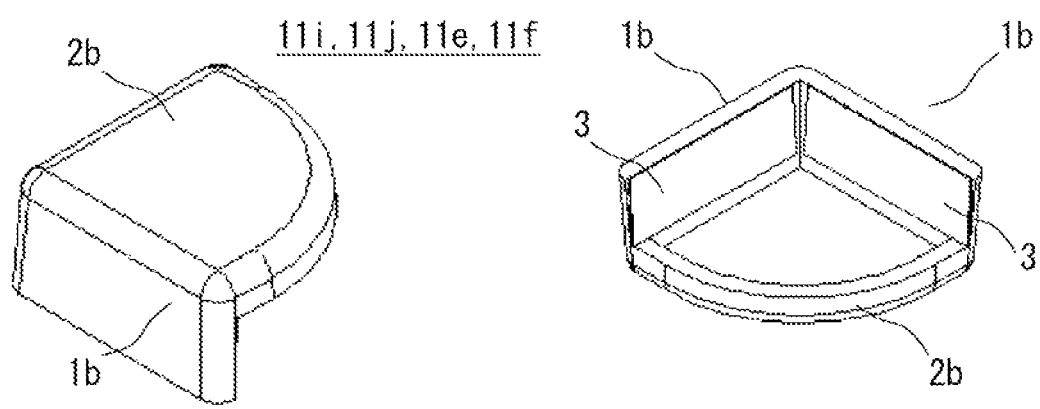
FIG. 25 shows structures of left and right upper and lower holding elements shown in FIG. 24.
Figure 26:
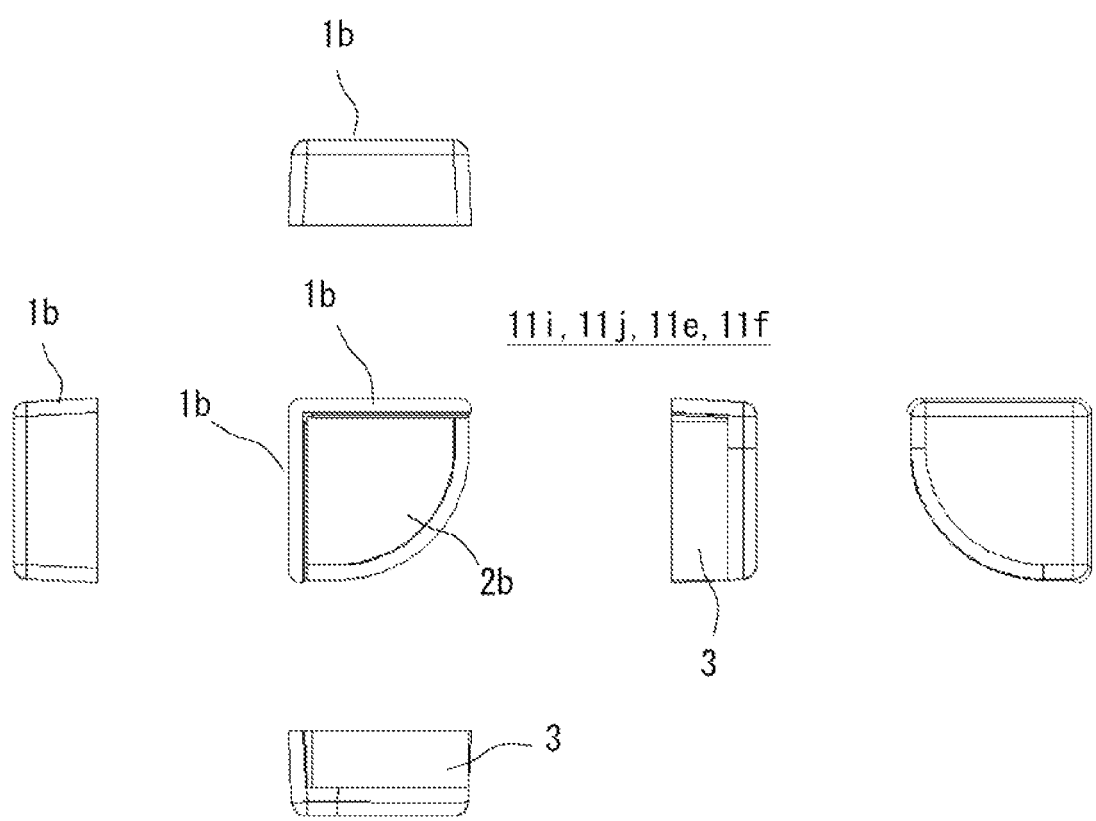
FIG. 26 shows six-sided views of the left and right upper and lower holding elements shown in FIG. 24.

FIG. 25 shows a configuration of the lower-left and lower-right edge holding element 11e and 11f, and the upper-left and upper-right edge holding elements 11i and 11j, and FIG. 26 shows six-sided views thereof. FIGS. 25 and 26 are the same as FIGS. 21 and 22. That is, the extension part 2b has a ¼ circle shape. A roughly rectangular attachment part 1b is connected to each of the two straight sections of the extension part 2b at a roughly right angle.

When the lower-left and lower-right edge holding elements 11e and 11f are disposed at the lower-left edge and the lower-right edge, respectively, of the touch panel 13, the two attachment parts 1b of each of them are positioned at the lower side and the lateral side, respectively, of the touch panel 13. That is, the lower-side holding part is continuously provided (i.e., continuously extend) from the lower edge holding elements.

Further, when the upper-left and upper-right edge holding elements 11i and 11j are disposed at the upper-left edge and the upper-right edge, respectively, of the touch panel 13, the two attachment parts 1b of each of them are positioned at the upper side and the lateral side, respectively, of the touch panel 13. That is, the attachment part 1b disposed on the upper side of each of the upper-left and upper-right edge holding elements 11i and 11j form a closed part.

Figure 27:
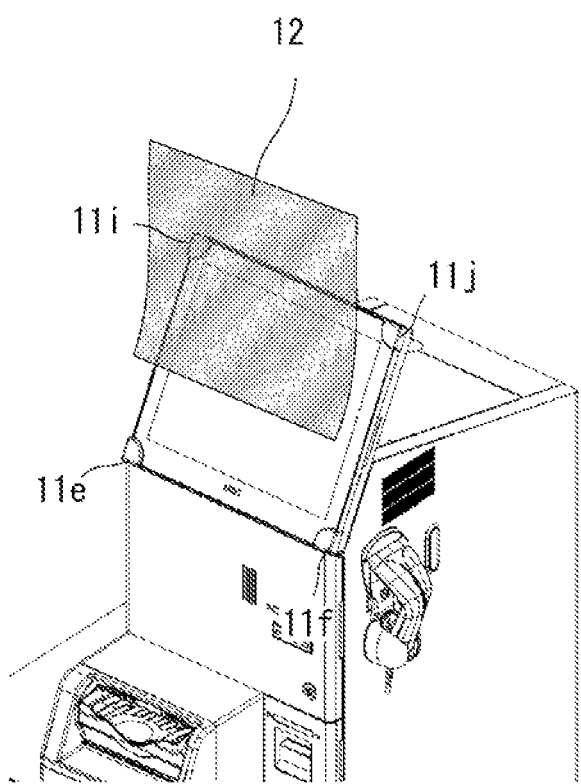
FIG. 27 is a diagram for explaining a method for manufacturing of a touch panel apparatus according to the fourth example embodiment.
Figure 28:
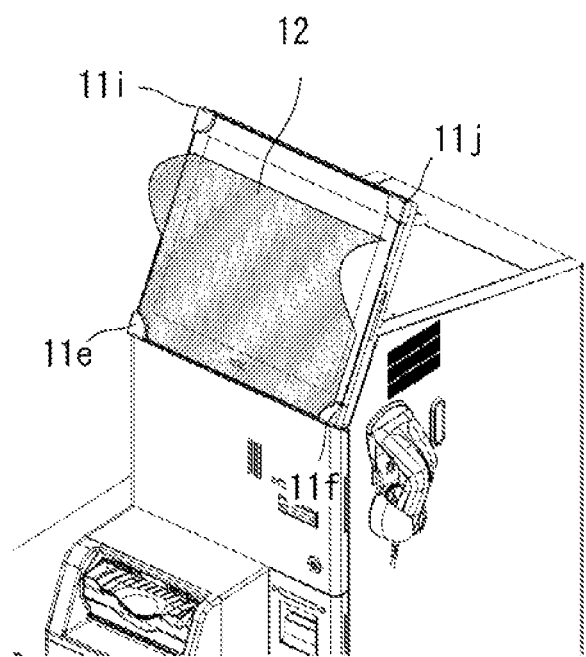
FIG. 28 is a diagram for explaining the method for manufacturing of the touch panel apparatus according to the fourth example embodiment.
Figure 29:
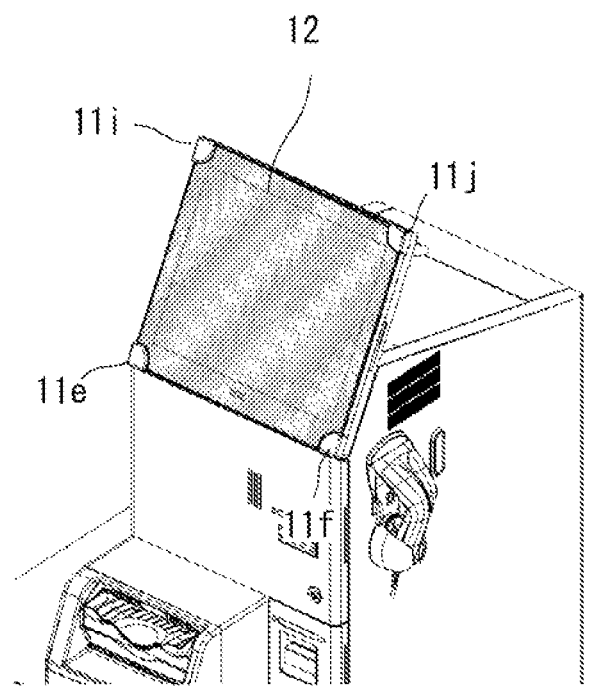
FIG. 29 is a diagram for explaining the method for manufacturing of the touch panel apparatus according to the fourth example embodiment.

A process for attaching the protective sheet 12 to the touch panel 13, which is a part of the method for manufacturing the touch panel apparatus 10, will be described hereinafter with reference to FIGS. 27 to 29. As shown in FIG. 27, firstly, the lower-left and lower-right edge holding element 11e and 11f, and the upper-left and upper-right edge holding elements 11i and 11j are attached to the four corners, respectively, of the frame 14 in which the touch panel 13 is housed. In this way, a gap, in which the protective sheet 12 is disposed, is formed between the front surface of the touch panel 13 and the extension part 2b of each of the holding elements.

Then, the protective sheet 12 is inserted from the upper side of the touch panel 13 into the gap formed by the lower-left and lower-right edge holding elements 11e and 11f. After that, as shown in FIG. 28, by bending the protective sheet 12 so that its middle part bulges, the protective sheet 12 is inserted from the lower side of the touch panel 13 into the gap formed by the upper-left and upper-right edge holding elements 11i and 11j. In this way, as shown in FIG. 29, the protective sheet 12 can be easily disposed over the front surface of the touch panel 13. Note that the order of processes that are performed to insert the protective sheet 12 into the above-described gap is not limited to that in the example shown in FIGS. 27 to 29. Any order of processes can be adopted as long as the protective sheet 12 can be disposed from the front-surface side of the touch panel 13 by bending the protective sheet 12.

As described above, according to the example embodiment, it is possible to alleviate cumbersomeness that is caused when a protective sheet is attached over a touch panel or is replaced with new one. Further, touching that a user performs for an input operation, and for disinfection and cleaning is performed over the protective sheet 12, so that it is possible to prevent the touch panel 13 from deteriorating.

Note that the present invention is not limited to the above-described example embodiments, and they can be modified as appropriate without departing from the scope of the invention. Although the structure for attaching a protective sheet according to an example embodiment is applied to a POS terminal in the above-described examples, it is not limited to such cases. That is, the structure or the like can also be applied to other apparatuses in which a touching operation is performed.

The whole or part of the example embodiments disclosed above can be described as, but not limited to, the following supplementary notes.

(Supplementary Note 1)

A method for manufacturing a touch panel apparatus comprising:

providing a lower-side holding part on a lower side of a rectangular touch panel;

providing two lateral-side holding parts on two lateral sides, respectively, of the touch panel, the two lateral sides being adjacent to the lower side of the touch panel; and disposing a transparent protective sheet having a shape roughly identical to that of the touch panel, from a side of the touch panel on which none of the lower-side holding part and the lateral-side holding parts is disposed, so as to cover a front surface of the touch panel, and detachably holding the protective sheet by the lower-side holding part and the lateral-side holding parts.

(Supplementary Note 2)

The method for manufacturing a touch panel described in Supplementary note 1, wherein the lower-side holding part and the lateral-side holding parts are provided independently of each other, each of the lower-side holding part and extension parts of the lateral-side holding parts extends to an area in front of the front surface of the touch panel, and the protective sheet is inserted from a side of the touch panel on which none of the lower-side holding part and the lateral-side holding parts is disposed into a gap between the front surface of the touch panel and the extension parts, and is thereby disposed in the gap.

(Supplementary Note 3)

The method for manufacturing a touch panel described in Supplementary note 1, wherein the lower-side holding part and the lateral-side holding parts are continuously provided, each of the lower-side holding part and extension parts of the lateral-side holding parts extends to an area in front of the front surface of the touch panel, and the protective sheet is inserted from a side of the touch panel on which none of the lower-side holding part and the lateral-side holding parts is disposed into a gap between the front surface of the touch panel and the extension parts, and is thereby disposed in the gap.

(Supplementary Note 4)

The method for manufacturing a touch panel described in Supplementary note 1, wherein upper edge holding elements and lower edge holding elements included in the lateral-side holding parts are provided independently of each other at upper ends and lower ends, respectively, of the lateral sides, the lower-side holding part is continuously provided from the lower edge holding elements, each of the lower-side holding part and extension parts of the lateral-side holding parts extends to an area in front of the front surface of the touch panel, an opened part is formed at a place in the upper edge holding element corresponding to the upper side of the touch panel, the opened part being configured to open an area between the front surface of the touch panel and the extension part, and the protective sheet is positioned between the front surface of the touch panel and the extension part through the opened part.

(Supplementary Note 5)

The method for manufacturing a touch panel described in Supplementary note 1, wherein upper edge holding elements and lower edge holding elements included in the lateral-side holding parts are provided independently of each other at upper ends and lower ends, respectively, of the lateral sides, the lower-side holding part is continuously provided from the lower edge holding elements, each of the lower-side holding part and extension parts of the lateral-side holding parts extends to an area in front of the front surface of the touch panel, a closed part is formed at a place in the upper edge holding element corresponding to the upper side of the touch panel, the closed part being configured to close an area between the front surface of the touch panel and the extension part, and the protective sheet is inserted from a front-surface side of the touch panel into a gap between the front surface of the touch panel and the extension part by bending the protective sheet, and is thereby disposed in the gap.

(Supplementary Note 6)

The method for manufacturing a touch panel described in any one of Supplementary notes 2 to 5, further comprising:

providing a frame so as to surround an outer periphery of the touch panel;

attaching the lower-side holding part and the lateral-side holding parts to the frame; and bringing the extension part into contact with a front edge of the frame protruding beyond the front surface of the touch panel, and thereby forming a gap between the front surface of the touch panel and the extension part, the gap being formed to dispose the protective sheet therein.

(Supplementary Note 7)

The method for manufacturing a touch panel described in Supplementary note 6, wherein the protective sheet is disposed so that a part thereof is disposed over a side of the frame on which none of the lower-side holding part and the lateral-side holding parts of the frame is disposed.

Although the present disclosure is explained above with reference to example embodiments, the present disclosure is not limited to the above-described example embodiments.

Various modifications that can be understood by those skilled in the art can be made to the configuration and details of the present invention within the scope of the invention.

This application is based upon and claims the benefit of priority from Japanese patent application No. 2020-111081, filed on Jun. 29, 2020, the disclosure of which is incorporated herein in its entirety by reference.

REFERENCE SIGNS LIST

1 ATTACHMENT PART
1a ATTACHMENT PART
1b ATTACHMENT PART
2 EXTENSION PART
2a EXTENSION PART
2b EXTENSION PART
3 DOUBLE-SIDED TAPE
4 TIP PART
5 FIXING HOLE
6 OPENED PART
10 TOUCH PANEL APPARATUS
11a LOWER-SIDE HOLDING PART
11b LEFT-SIDE HOLDING PART
11c RIGHT-SIDE HOLDING PART
11d INTEGRAL-TYPE HOLDING PART
11e LEFT-LOWER EDGE HOLDING ELEMENT
11f RIGHT-LOWER EDGE HOLDING ELEMENT
11g UPPER-LEFT EDGE HOLDING ELEMENT
11h UPPER-RIGHT EDGE HOLDING ELEMENT
11i UPPER-LEFT EDGE HOLDING ELEMENT
11j UPPER-RIGHT EDGE HOLDING ELEMENT
12 PROTECTIVE SHEET
13 TOUCH PANEL
14 FRAME
14a TOP
14b HOUSING PART
20 HANDY SCANNER

What is claimed is:

1. A touch panel apparatus comprising:
a roughly rectangular touch panel;
a transparent protective sheet having a shape roughly identical to that of the touch panel and detachably disposed so as to cover a front surface of the touch panel;
at least one lower-side holding part for holding the transparent protective sheet, disposed on a lower side of the touch panel;
at least two lateral-side holding parts for holding the transparent protective sheet, disposed on two lateral sides, respectively, of the touch panel, the two lateral sides being adjacent to the lower side of the touch panel; and
a frame disposed so as to surround an outer periphery of the touch panel, the frame being configured so that the lower-side holding part and the lateral-side holding parts are attached thereto, wherein
each of the lower-side holding part and the lateral-side holding parts includes an attachment part to be bonded to an outer surface of the frame, and an extension part extending to an area in front of the front surface of the touch panel in a direction roughly perpendicular to the attachment part,
a front edge of the frame protrudes beyond the front surface of the touch panel and the extension parts comes into contact with the front edge of the frame, so that a housing part is formed by the front surface of the touch panel, the extension parts, and the frame, the housing part being formed to dispose the transparent protective sheet therein,
the transparent protective sheet is inserted from a side of the touch panel on which none of the lower-side holding part and the lateral-side holding parts is disposed into a gap between the front surface of the touch panel and the extension parts, and is thereby disposed in the gap, and
the transparent protective sheet is inserted into the gap along one direction from an upper side to a lower side of the frame.

2. The touch panel apparatus according to claim 1, wherein
the lower-side holding part and the lateral-side holding parts are provided independently of each other.

3. The touch panel apparatus according to claim 1, wherein
the lower-side holding part and the lateral-side holding parts are continuously provided.

4. The touch panel apparatus according to claim 1, wherein the transparent protective sheet has such a size that when the transparent protective sheet is disposed between the front surface of the touch panel and the extension parts, a part of the transparent protective sheet is disposed over a side of the frame on which none of the lower-side holding part and the lateral-side holding part is disposed.

5. A method for manufacturing a touch panel apparatus comprising:
providing a frame so that the frame surrounds an outer periphery of a roughly rectangular touch panel, and a front edge of the frame protrudes beyond a front surface of the touch panel;
providing at least one lower-side holding part on a lower side of the touch panel;
providing at least two lateral-side holding parts on two lateral sides, respectively, of the touch panel, the two lateral parts being adjacent to the lower side of the touch panel, wherein each of the lower-side holding part and the lateral-side holding parts includes an attachment part to be bonded to an outer surface of the frame, and an extension part extending to an area in front of the front surface of the touch panel in a direction roughly perpendicular to the attachment part;
forming a housing part, by bringing the extension parts into contact with the front edge of the frame, by the front surface of the touch panel, the extension parts, and the frame, the housing part being formed to dispose a transparent protective sheet having a shape roughly identical to that of the touch panel therein; and
disposing the transparent protective sheet, from a side of the touch panel on which none of the lower-side holding part and the lateral-side holding parts is disposed, in the housing part so as to cover the front surface of the touch panel, and detachably holding the transparent protective sheet by the lower-side holding part and the lateral-side holding parts, wherein
the transparent protective sheet is inserted from a side of the touch panel on which none of the lower-side holding part and the lateral-side holding parts is disposed into a gap between the front surface of the touch panel and the extension parts, and is thereby disposed in the gap, and the transparent protective sheet is inserted into the gap along one direction from an upper side to a lower side of the frame.

\* \* \* \* \*